United States Patent [19]

Gritters et al.

[11] Patent Number: 4,619,769

[45] Date of Patent: Oct. 28, 1986

[54] PROCESS FOR REGENERATING MEDIA FILTERS USED TO FILTER GEOTHERMAL BRINE

[75] Inventors: Gregory A. Gritters, Indio; Jose M. Perez, Calexico, both of Calif.

[73] Assignees: Union Oil Co. of California, Los Angeles; Mono Power Co., Rosemead; Southern Pacific Land Co., San Francisco, all of Calif.

[21] Appl. No.: 687,199

[22] Filed: Dec. 28, 1984

[51] Int. Cl.⁴ .......................................... B01D 23/24
[52] U.S. Cl. ................................ 210/747; 210/779; 210/794; 210/798
[58] Field of Search .............. 210/774, 779, 791–798, 210/747

[56] References Cited

U.S. PATENT DOCUMENTS

| | | | |
|---|---|---|---|
| 1,616,471 | 2/1927 | Arentz . | |
| 3,625,886 | 12/1971 | Mattia | 210/32 |
| 3,680,701 | 8/1972 | Holca | 210/80 |
| 3,948,769 | 4/1976 | Dobbs | 210/132 |
| 4,191,652 | 3/1980 | Whitmore | 210/274 |
| 4,336,232 | 6/1982 | Moritz | 210/794 X |
| 4,370,239 | 1/1983 | Jensen | 210/668 |
| 4,379,295 | 3/1983 | Axtmann | 210/792 X |
| 4,444,625 | 4/1984 | Smith | 210/798 X |
| 4,518,505 | 5/1985 | Lim et al. | 210/794 X |
| 4,522,728 | 6/1985 | Gallup et al. | 210/747 X |

Primary Examiner—Thomas Wyse
Attorney, Agent, or Firm—Howard R. Lambert; Walter A. Hackler

[57] ABSTRACT

A process for regenerating media filters used to filter geothermal brine, especially flashed and clarified, silica-rich brine, comprises flowing steam through the filter in a backflush direction at a rate and for a time duration agitating the filter media and filtered-out material. The process includes, preferably after the steam flow is stopped, flowing brine, for example, filtered brine, through the filter in the backwash direction to flush out the material loosened and broken up by the steam scour and restratify the media bed components, and may include partially draining the filters prior to the steam scour. Preferably, the steam used for the steam scour is low pressure steam obtained from low pressure flashing of the brine being filtered. Steam flow rates are preferably between about 2 and about 10 SCFM per square foot of filter cross-sectional area in the region of the filter media; steam flow rate is preferably about 5 minutes after any steam quenching has ceased. Backflush brine flow rate is preferably between about 15 and about 30 gpm per square foot of filter cross-sectional area in the filter media region. The brine flow duration is preferably between about 5 and about 15 minutes.

23 Claims, 2 Drawing Figures

PROCESS FOR REGENERATING MEDIA FILTERS USED TO FILTER GEOTHERMAL BRINE

BACKGROUND OF THE INVENTION

1. Field of the Invention

The present invention relates generally to the production of electric power by use of geothermal water or brine and more particularly to processes for regenerating media filters used to filter the geothermal water or brine prior to reinjection thereof.

2. Discussion of the Prior Art

Large subterranean aquifers of naturally produced (geothermal) steam or hot aqueous liquids, specifically water or brine, are found throughout the world. These aquifers, which often have vast amounts of energy potential, are most commonly found where the earth's near-surface thermal gradient is abnormally high, as evidenced by unusually great volcanic, fumarole or geyser activity. Thus, as an example, geothermal aquifers are fairly common along the rim of the Pacific Ocean, long known for its volcanic activity.

Geothermal steam or water has, in some regions of the world, been used for centuries for therapeutic treatment of physical infirmities and diseases. In other regions, such geothermal fluids have long been used to heat dwellings and in industrial processes. Although efforts to further develop geothermal resources for these site-restrictive uses continue, considerable recent research and development has, instead, been directed to exploitation of geothermal resources for production of electrical power which can be conducted, often over existing power grids, for long distances from the geothermal sources. In particular, recent steep increases in the cost of pertroleum products used for conventional production of electric power, as well as actual or threatened petroleum fuel shortages or embargos have intensified the interest in use of geothermal fluids as an alternative and generally self-renewing source of power plant "fuel".

General processes by which geothermal fluids can be used to generate electric power are known and have been known for some time. As an example, geothermal steam, after removal of particulate matter and polluting gases such as hydrogen sulfide and ammonia, can be used in the manner of boiler-generated steam to operate steam turbine generators.

Naturally pressurized geothermal brine or water having a temperature of over about 400° F. can be flashed to a reduced pressure to convert some of the brine or water to steam. The steam produced in this manner can then be used to drive steam turbine generators. The flashed geothermal liquid and the steam condensate obtained from power generation can typically be reinjected to replenish the aquifer and prevent ground subsidence. Cooler geothermal brine or water can often be used to advantage in binary systems in which a low-boiling point, secondary liquid is vaporized by the hot geothermal liquid, the vapor produced being used to operate gas turbine generators.

As might be expected, use of geothermal steam is preferred over use of geothermal water or brine for generating electric power because the steam can be used more directly, easily and cheaply. Consequently, where readily and abundantly available, geothermal steam has been used for a number of years to generate commercially important amounts of electric power at favorable costs. For example, by the late 1970's geothermal steam at The Geysers in Northern California was generating about two percent of all of California's electricity consumption.

While energy production facilities at important geothermal steam sources, such as at The Geysers, are still being expanded, when not already at capacity, the known number of important geothermal steam aquifers is small compared to those of geothermal brine or water. Current estimates are, in fact, that good geothermal brine or water sources are about five times more prevalent than are good sources of geothermal steam. The potential for generating electric power is, therefore, much greater for geothermal brine and water than it is for geothermal steam. As a result, considerable current geothermal research is understandably directed towards the development of economical geothermal brine and water electric generating plants, much of this effort being expended towards use of vast geothermal brine resources in the Imperial Valley of southern California.

Although, as above mentioned, general processes are known for using geothermal brine or water for production of electric power, difficult problems, especially with the use of highly saline geothermal brine, have often been encountered in practice. These problems have frequently been so great as to impede the progress of geothermal brine power plant development in many areas.

These severe problems relate primarily to the typically complex composition of geothermal brines. At natural aquifer temperatures in excess of about 400° F. and pressures in the typical range of 400 to 500 psig, the brine leaches large amounts of salts, minerals and elements from the aquifer formation. Thus, although brine composition may vary from aquifer to aquifer, wellhead brine typically contains very high levels of dissolved silica as well as substantial levels of dissolved heavy metals such as lead, zinc, copper, iron and cadmium. In addition many other impurities, particulate matter and dissolved gases are present in most geothermal brines.

As natural brine pressure and temperature are substantially reduced in power plant steam conversion (flashing) stages, silica saturation levels in the brine are typically exceeded and silica precipitates from the brine, as a tough scale, onto surrounding equipment walls and in reinjection wells, often at a rate of several inches in thickness per month. Scale, so formed, typically comprises iron-rich silicates, containing varying amounts of brine impurities, and is usually very difficult, costly and time consuming to remove from equipment. Because of the fast scale forming rates, extensive facility down time for descaling operations may commonly be required at some geothermal brine facilities. Injection wells may also require frequent and extensive rework and new injection wells may, from time to time, have to be drilled at great cost.

Considerable effort has, as a consequence, been directed towards developing processes for eliminating or substantially reducing silica scaling in flashed brine handling equipment and injection wells.

To this end, a scale reduction process of particular interest causes controlled, induced silica precipitation from the brine in the flashing stage by utilizing seed crystallization techniques. By such process, when silica saturation levels in the brine are reached as a result of the brine being flashed to a reduced pressure, the "excess" silica is induced to precipitate or crystallize onto seed crystals intentionally introduced into the flashing vessels. Circulation of flashed brine and seed material in the flashing vessels enhances and accelerates the silica crystallization process. Downstream of the flashing-crystallizing stage, most of the silicious precipitate is separated from the brine in a reactor-clarifier stage. Some of the silicious precipitate from the reactor-clarifier stage is pumped back upstream to the flashing-crystallizing stage as seed crystals. Clarified brine is discharged from the reactor-clarifier stage for return to the ground by the injection stage.

Although most of the silicious precipitate is separated from the brine in the reactor-clarifier stage, significant amounts of precipitate are nevertheless carried along in suspension with the discharged brine. Typically, suspended material is in the form of very small particles less than about 6 microns in size which are not readily separated from the brine. Concentrations of these suspended particles in the brine discharged from the reactor-clarifier may be in the approximate range of 100 to 300 parts per million (ppm) by weight.

At very high brine flow rates, which may, for example, be about 1.3 million pounds per hour for a 10 megawatt geothermal brine power plant, these fine, suspended silicious particles cause scale buildup in downstream equipment and gradually plug up the brine injection wells and fissures in the formation into which the brine is injected. To prevent such scaling and plugging problems, brine discharged from the reactor-clarifier stage is typically flowed through a filtering stage constructed to remove most of the fine suspended particles from the brine. When properly operating, the filtering stage, which may comprise several filters in series and/or parallel relationship, ordinarily removes suspended particles in the brine larger than about 2 micron in size and typically reduces the particle concentration in the brine discharged from the filters to less than about 30 ppm and often to less than about 10 ppm. Such concentrations of 2 micron or less particles in the brine effluent can generally be tolerated by the brine reinjection stage without excessive scale formation and/or injection well plugging.

The fine silicious particles removed from the brine by the filters, of course, accumulate in the filters and it has been found that, in time, the particles aggregate into large masses which may reach several inches across. Agglomerations of such nature cause loss of filter effectiveness and eventual choking off of brine flow through the filtering stage.

Media filters used for brine filtering are commonly cleaned by backwashing the filters with a flow of filtered brine. However, most types of filters must be out of service during backwashing; it is thus ordinarily desirable to backwash no oftener than is necessary to maintain proper filtering operation. Another reason for not backwashing the filters any more frequently than is necessary is that backwash water must be provided and dirty backwash water must be disposed of. On the other hand, if backwashing is too infrequent, the silicious agglomerate may be impossible to remove and repacking of the filters is then necessary at relatively great expense.

Because of cohesiveness of the silicious particles removed by the media filters, even relatively small agglomerations are difficult to remove by backwashing; hence, relatively frequent backwashing has been found necessary in order to minimize silica agglomeration. For example, backwash intervals as short as 8 hours have, in some cases, been found necessary.

It is generally known, as evidenced by the disclosures of U.S. Pat. Nos. 3,680,701 and 4,191,652 to Holca and Whitmore, respectively, that backwash effectiveness of some types of media filters not used for geothermal brine, may be greatly enhanced by a pre-backwash, pressurized air "scour" of the filters. Air, under pressure, flowed through the filters in the backwash direction agitates the filter media and tends to break up and/or loosen filtered-out material so that the subsequent water backwash can effectively flush out entrapped particles.

However, such air scouring is inappropriate for media filters used for filtering silica-rich geothermal brine, since enhanced corrosion and scaling are known to be caused by contacting geothermal brine with air. Silica precipitation from geothermal brine has been found to be enhanced by the presence of ferric ions, the resulting precipitate being generally of an iron-rich silicious material, the exact composition of which is quite complex and is, therefore, considered not entirely understood. Silica-rich geothermal brine normally contains an appreciable amount of dissolved iron, mostly, however, in the ferrous ion form which does not induce or enhance silica precipitation. If the brine is contacted with air, some of the ferrous ions are oxidized to ferric ions, which do greatly enhance corrosion and scaling. As a consequence, great care is typically taken to avoid or minimize contacting geothermal brine with air. It is therefore considered that geothermal brine media filters should not be air scoured in order to avoid scaling and corrosion in the filters and downstream equipment. Nevertheless, improved media filter regenerating processes are required to increase the time between backflushes and/or improve backflush effectiveness, thereby reducing power plant operating costs.

It is, therefore, an object of the present invention to provide an improved process for regenerating geothermal brine media filters, which includes non-air, pre-backwash scouring of the filters.

Another object of the present invention is to provide an improved process for regenerating geothermal brine media filters which includes using steam obtained from the geothermal brine for scouring the filters.

Additional objects, advantages and features of the present invention will become apparent to those skilled in the art from the following description, when taken in conjunction with the accompanying drawing.

SUMMARY OF THE INVENTION

According to the present invention, a process for regenerating media filters used for filtering geothermal brine comprises flowing steam, preferably at a pressure of about 10 psig, through the filter in a backflush direction, so as to cause agitation of the filter media. The process includes flowing geothermal brine, preferably after the steam scour, and preferably using filtered brine, through the filter in the backflush direction. According to an embodiment, the steam flowing step is preceded by at least partly draining the filter so that the brine level is preferably just above the upper surface of the filter media. When the geothermal brine is under substantial natural pressure upon extraction from the earth, the steam flowing step preferably includes flowing steam produced from the brine by flashing the geothermal brine to a reduced pressure.

A steam flow rate is, for a specific embodiment, preferably selected to be between about 2 SCFM and about 10 SCFM, and more preferably to be between about 3 SCFM and about 7 SCFM, per square foot of filter cross-sectional area in the region of the filtering media so as to loosen and break up, and in some cases to prevent the formation of agglomerations of filtered-out material. Moreover, a steam flow duration is preferably selected so as to cause at least about 5 minutes of actual steam flow through the filter after initial steam quenching, if any, by the media filters and filtered brine remaining entrapped therein. The total steam flow duration may, for example, be about 15 minutes, when the steam during about the first 10 minutes of flow is quenched by the filter media and entrapped brine.

A brine backflush flow rate may be selected to be between about 15 gpm and about 30 gpm, and preferably to be between about 20 gpm and about 28 gpm, per square foot of filter cross-sectional area in the region of the filtering media so as to flush out material loosened or broken up by the steam flow and to stratify the media bed components when the media filters include two or more layers of different media. Additionally, the brine flow duration may be selected to be at least about 5 minutes and is preferably selected to be between about 5 minutes and about 15 minutes. Preferably, the brine backflushing is performed after the steam backflush is completed, but may be performed concurrently.

In brine handling facilities in which the geothermal brine used is naturally pressurized to several hundred, for example, at least about 400, psig and contains large amounts of dissolved silica, in which such pressurized brine is flashed to a lower pressure to convert some of the brine into steam, in which the flashed brine is contacted with seed material onto which supersaturated silica from the brine crystallizes (deposits) and in which the flashed brine is flowed through a reactor-clarifier stage wherein the crystallized silica is separated from the brine, the brine then being flowed through the media filter for filtering, the process of the present invention preferably includes combining the backwash brine discharged from the filter with the system flow of geothermal brine upstream of the reactor-clarifier stage for disposal purposes.

An effective and efficient process for regenerating geothermal brine media filters is, therefore, provided which is compatible with typical geothermal brine handling systems, brine being used for the backwashing. When steam is produced from the brine in the brine handling system, some of the steam, preferably low pressure steam, is utilized to scour the media filters prior to the brine backwash. Backwash effluent is preferably combined with the main flow of brine through the brine handling system so as to enable disposal of the effluent with the brine by conventional brine injection techniques.

BRIEF DESCRIPTION OF THE DRAWINGS

The present invention will be more readily understood by reference to the drawing which is a simplified schematic drawing of an exemplary geothermal brine electric power plant in which the invention may be practiced to advantage, FIG. 1a on one sheet showing part of the power plant and FIG. 1b on a second sheet showing the rest of the power plant.

DESCRIPTION OF THE PREFERRED EMBODIMENT

Figure 1A:
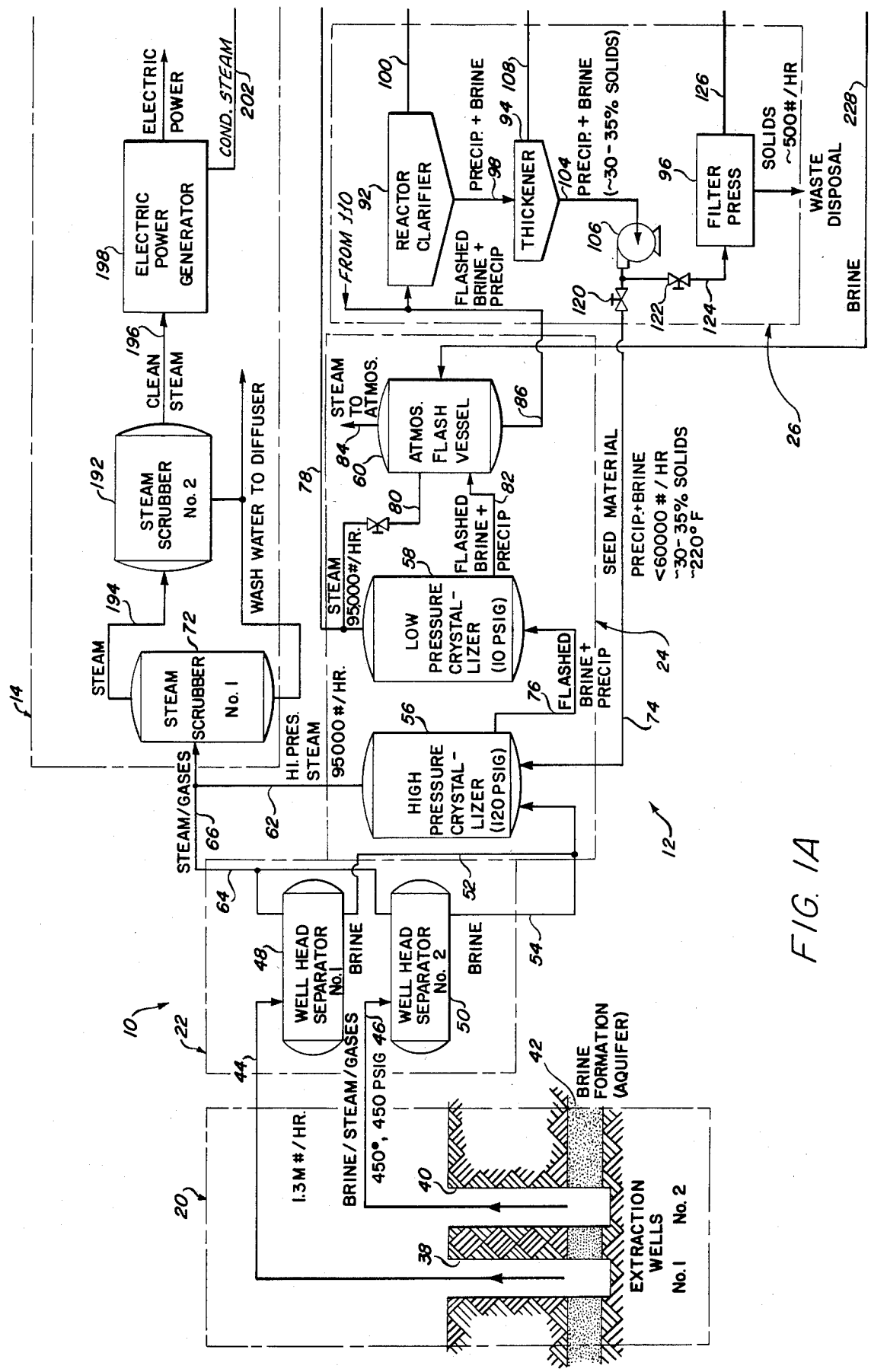

The present process for regenerating media filters through which geothermal brine is flowed can be better understood by the consideration of an exemplary geothermal brine power plant in which the process may be used to advantage. Shown, therefore, in simplified form in FIGS. 1a and 1b is an exemplary geothermal brine power plant 10 which comprises generally a brine handling portion 12 and an associated electric power generating portion 14.

In general, the function of brine handling portion 12 is the extraction of hot pressurized geothermal brine from the ground; conversion, by a flashing process, of part of the brine to steam for use by power generating portion 14 and reinjection into the ground of the flashed brine and of steam condensate (if any) returned from the power plant portion. Function of power generating portion 14 is use of steam from brine handling portion 12 for the production of electric power.

Brine handling portion 12 comprises generally a brine extraction stage 20, (FIG. 1a) wellhead separation stage 22, a steam production (flashing) and silica crystallization stage 24, a brine clarification stage 26, a brine filtering stage 28 (FIG. 1b), in which the present filter regeneration process is practiced, and a brine reinjection stage 30.

Figure 1B:
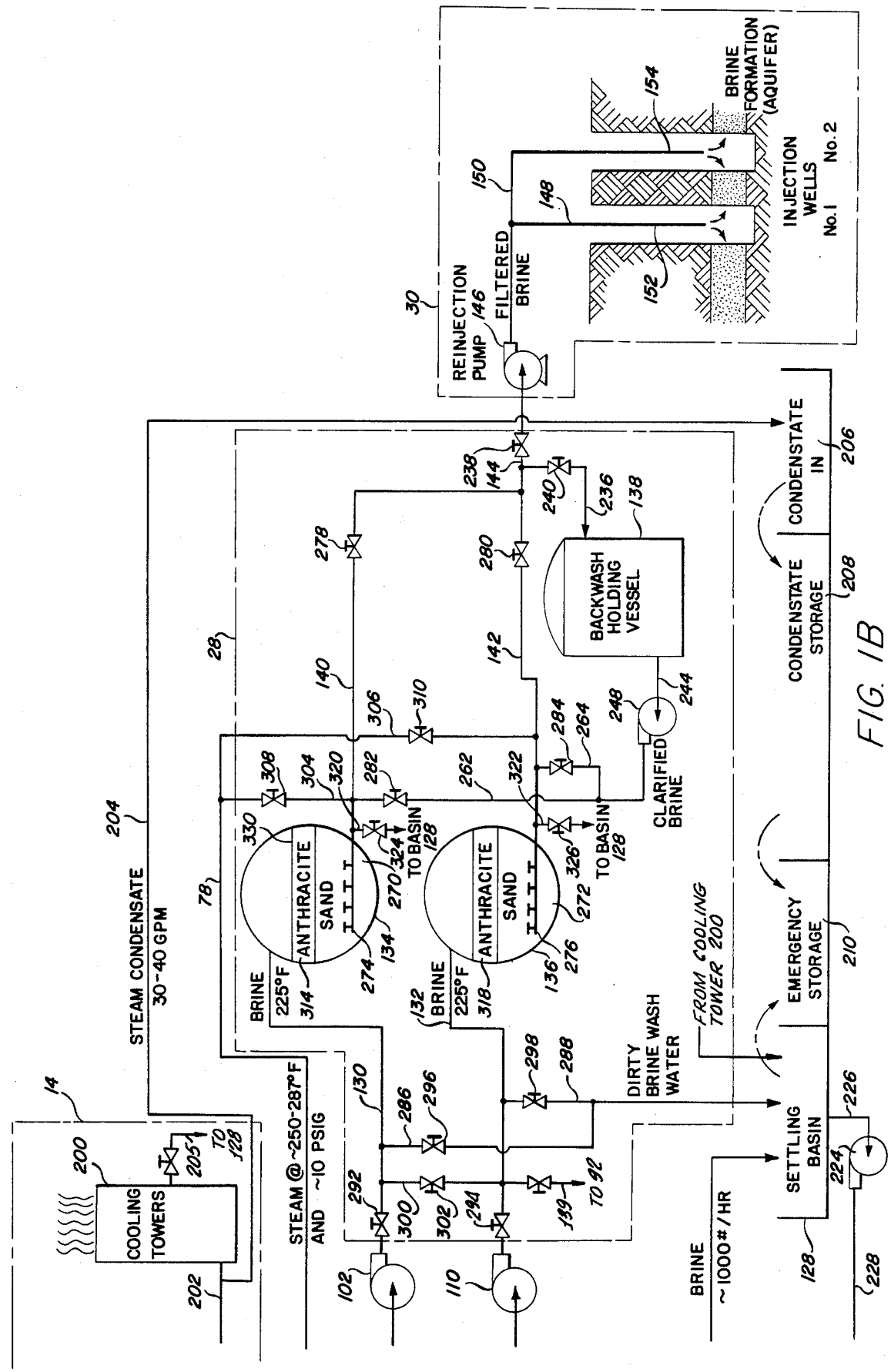

More specifically, brine extracting stage 20, as shown in FIG. 1a, includes first and second geothermal brine extraction wells 38 and 40 by means of which geothermal brine is extracted from a common underground aquifer 42. At the wellhead, the geothermal brine may have a temperature of between about 400° F. and about 600° F. and be at a natural pressure of between about 400 psig and about 500 psig, typical temperatures and pressures being about 450° F. and about 450 psig. At the mentioned high temperatures and pressures, the geothermal brine dissolves substantial amounts of minerals and elements from aquifer formation 42. In particular, the brine normally contains considerable dissolved salts (hence, the termination "brine") and is typically saturated with silica. Moreover, the brine as extracted may contain appreciable amounts of dissolved elements such as lead, zinc, copper, iron, cadmium, silver manganese, arsenic and antimony. Gases such as hydrogen sulfide, ammonia and carbon dioxide may be intermixed with the brine. Geothermal brine thus, ordinarily comprises heavily contaminated water and may typically have a wellhead pH of about 5 to 5.5, being thereby slightly acidic.

From wells 38 and 40, the brine is fed, through conduits 44 and 46 to respective first and second wellhead separators 48 and 50 which comprise separator stage 22 (FIG. 1a). In wellhead separators 48 and 50 steam and such non-condensable gases as hydrogen sulfide and ammonia which are mixed with the brine are separated from the brine.

From wellhead separators 48 and 50, the brine is fed through conduits 52 and 54 into the bottom of a high pressure flash crystallizer 56 which together with a low pressure flash crystallizer 58 and an atmospheric flash vessel 60 comprise steam production (flashing) and silica crystallization stage 24. In high pressure flash crystallizer 56 the brine is flashed to a reduced pressure of, for example, about 120 psig so as to convert part of the brine into steam. As an illustration, for a flow of about 1.3 million pounds of about 450° F. and 450 psig brine per hour into high pressure flash crystallizer 56, about 95,000 pounds of 120 psig of steam may be produced. Such produced steam is discharged through a conduit 62 which joins a common steam/gas discharge conduit 64 from wellhead separators 48 and 50. Conduits 62 and 64 discharge into a common conduit 66 which delivers steam to first steam scrubber 72 of power generating portion 14.

Silicious seed material is fed, through a conduit 74 into high pressure flash crystallizer 56 from brine clarification stage 26, as described below. Within crystallizer 56, silica from the brine, which typically becomes supersaturated in silica as a result of being flashed to a reduced pressure, preferentially crystallizes (with other impurities from the brine) onto the seed material as a silicious deposit, the brine and seed material being circulated in crystallizer 56.

From high pressure flash crystallizer 56, brine and suspended, crystallized silicious material is flowed through a conduit 76 into the bottom of low pressure flash crystallizer 58. In low pressure crystallizer 58, the brine is flashed to a reduced pressure of, for example, about 10 psig to convert additional brine into steam. For the exemplary brine flow rate mentioned above, the amount of steam produced in low pressure flash crystallizer 58 may also be about 95,000 pounds per hour. Part of such additionally produced steam, which has relatively low energy content, is, as described below, selectively used for steam scouring in the present filter regenerating process, being for this purpose discharged through a conduit 78. Remaining steam from low pressure crystallizer 58 may be used for such other purposes as heating or may be discharged from the low pressure crystallizer, through a conduit 80 into atmospheric flash vessel 60. Within low pressure flash crystallizer 58, silica saturation levels are again exceeded, and additional silica is crystallized from the brine onto the silica particles entrained in the brine. From crystallizer 58, brine and the entrained silicious precipitate are flowed through conduit 82 to atmospheric flash vessel 60.

In atmospheric flash vessel 60, the brine is flashed to atmospheric pressure, releasing still more steam. Typically, such steam is released, through a conduit 84, into the atmosphere. Alternatively, this steam may be used for heating or the like. Silica crystallization from the brine continues in atmospheric flash vessel 60. Brine and the entrained silicious material are discharged from vessel 60 through a conduit 86, to a recirculation-type, reactor-clarifier 92, which with a thickener 94 and a filter press 96 comprise final brine clarification and stabilization stage 26. Within reactor-clarifier 92, the silicious material is allowed to settle as a sludge which is removed with some brine from the bottom of the reactor-clarifier through a conduit 98. Clarified brine, still containing small amounts of very fine silicious particulate matter, is discharged from the reactor-clarifier through a conduit 100 to a first pump 102 (FIG. 1b). Wet silicious sludge is delivered, through conduit 98, to sludge thickener 94 in which much of the brine is removed from the sludge. De-watered sludge is discharged from thickener 94, through a conduit 104, to a sludge pump 106. Brine from thickener 94 is discharged, through a conduit 108, to a second pump 110 (FIG. 1b).

Sludge pump 106 pumps part of the silica sludge from conduit 104 through conduit 74 into high pressure flash crystallizer 56 as seed material and the rest of the sludge through a conduit 124 into filter press 96. Valves 120 and 122 in respective conduits 74 and 124 control sludge flow from sludge pump 106. Brine from filter press 96 is flowed through a conduit 126 to a setting basin 128 (FIG. 1b). "Dry" sludge, still, however, containing some entrapped brine, is discharged from filter press 96 for additional treatment and/or disposal. For the mentioned brine flow rate of about 1.3 million pounds per hour, the "dry" sludge may be discharged from filter press 96 at a rate of about 500 pounds per hour (six tons per day).

Brine pumps 102 and 110 (FIG. 1b) pump brine from reactor-clarifier 92 and thickener 94, through conduits 130 and 132, into first and second media filters 134 and 136 which, with a backwash holding vessel 138 comprise part of brine filtering stage 28, more particularly described below in connection with the present invention. Alternatively, pump 110 may pump brine from thickener 94, through a conduit 139 back to the inlet of reactor-clarifier 92. From filters 134 and 136, filtered brine is flowed through respective conduits 140 and 142 and common conduit 144, to a reinjection pump 146. From pump 146, the filtered brine is discharged, through conduits 148 and 150, into first and second injection wells 152 and 154, respectively; pump 146 and such wells comprising reinjection stage 30.

In power generating portion 14, steam is flowed from first steam scrubber 72 (FIG. 1a) to a second steam scrubber 192 through a conduit 194. From second scrubber 192, clean steam is fed through conduit 196 to turbine generator 198. Condensed steam is discharged from generator 198 to a cooling tower 200 (FIG. 1b) through a conduit 202. Excess steam condensate not required by tower 200, at a rate, for example, of about 30–40 gallons per minute, is fed through a conduit 204 to a "condensate in" vessel or tank 206. Cooling tower blowdown from tower 200 is discharged through conduit 205 to setting basin 128. From vessel 206 the condensate overflows into a condensate storage vessel or tank 208. An emergency overflow storage pond 210 is in overflow communication between condensate storage vessel 208 and brine setting basin 128. Typically, liquid from setting basin 128 is pumped by a brine pump 224, through conduits 226 and 228, back to atmospheric flash vessel 60 for combining therein with brine from low pressure flash crystallizer 58.

It is to be understood that power plant 10 is shown in FIG. 1 merely by way of example and, as such, has been shown somewhat simplified over an actual power plant which has a great many valves, conduits, controls and the like not shown or described. Also, for example, an actual geothermal brine power plant may have more than the two extraction wells 38 and 40, the two separators 48 and 50, the two filters 134 and 136 and the two injection wells 152 and 154 shown.

FILTER REGENERATION

Described more particularly, brine filtering stage 28 includes a backwash water supply conduit 236 connected between filtered brine conduits 144 and backwash holding vessel 138. Valve 238 in filtered brine conduit 144 to injection pump 146 and valve 240 in backwash supply conduit 236 control feeding of filtered brine from filters 134 and 136 into backwash holding vessel 138. Although use of filtered brine of backflushing is desirable, unfiltered brine may alternatively be used. Brine for backwashing filters 134 and 136 is discharged from holding vessel 138 through conduit 244 to backwash pump 248.

Backwash pump 248 provides backwash brine to filters 134 and 136 via a conduit 262 from the pump to filtered brine outlet conduit 140 and by a conduit 264 to filtered brine outlet conduit 142. Backwash brine is discharged into sand bed regions 270 and 272 of respective filters 134 and 136 through respective nozzle manifolds 274 and 276. Valves 278, 280, 282 and 284 in respective filtered brine conduits 140 and 142 and backwash brine conduits and 262 and 264 control flow of filtered brine out of filters 134 and 136 as well as control and flow of backwash brine from vessel 138 into the two filters.

Dirty backwash brine is discharged from upper regions of filters 134 and 136 through clarified brine inlet conduits 130 and 132, a conduit 286 connected to conduit 130 and a conduit 288 connected to conduit 132 discharging dirty brine to settling basin 128. Valves 292, 294, 296 and 298 in respective conduits 130, 132, 286 and 288 control flow of clarified brine into, and discharge of dirty backwash brine from, filters 134 and 136. An interconnecting conduit 300, having a valve 302, is connected between conduits 130 and 132 to enable dividing of clarified brine flow from pumps 102 and 110 between filters 134 and 136.

Low pressure steam discharged from low pressure flash crystallizer 58 through conduit 78 is divided into conduits 304 and 306 which are respectively connected to filtered brine outlet conduits 140 and 142. Valves 308 and 310 in respective conduits 304 and 306 control flow of steam into manifolds 274 and 276 of filters 134 and 136.

As shown in the Figure, filters 134 and 136 are of the mixed media type, although other types of filters may be used. Accordingly, filter 134 has a sand bed 270 which may be about 24 inches deep. On top of sand bed 270 is an anthracite layer 314 which may be about 12 inches deep. Filter 136 is similarly constructed with an anthracite layer 318 on top of sand bed 272. Typically, sand used in sand layers 312 and 316 may be of about 0.66 mm particle size. The anthracite in layers 314 and 318 may be between about 1.5 and about 2 mm particle size. However, other sizes and types of media may be encountered.

Typically, the particle size of silicious material suspended in clarified brine flowed into filters 134 and 136 is less than about 6 microns and the concentration thereof may, for example, be between about 150 ppm and about 300 ppm. Correspondingly, when filters 134 and 136 are operating properly, the silicious particle size in the filtered brine is typically less than about 2 microns and the concentration is less than about 30 ppm, being ideally less than about 10 ppm.

Conduits 320 and 322 are connected respectively, between filtered brine conduits 140 and 142 and settling basin 128, valves 324 and 326 in conduits 320 and 322 enable selective draining of filters 134 and 136.

Although only two filters 134 and 136 are shown in the Figure for illustrative purposes, it is to be appreciated that ordinarily more than two filters would be used in most power plants. For example, at least about four filters would ordinarily be used so as to provide reserve filtering capacity and so that one or more filters could be taken out of operation from time-to-time as may be required for backwashing, repacking or other servicing. To this end, filters 134 and 136, as well as additional filters which may be used, are connected in parallel flow relationship with various valves, as described above, being provided to isolate any selected filter or filters for backwashing and/or servicing without affecting filtering operation of the remaining filters.

It has now been determined from examination of filters (corresponding to filters 134 and 136), after different durations of operational use, that the fine particles, comprising mostly silica but with barite and other materials which precipitate from the brine with the silica, removed by the filter media are sticky and tend to agglomerate into so-called "mud balls". These mud balls, some of which may become as large as several inches across, tend to form within the media layers, corresponding to layers 270, 272, 314 and 318. Larger mud balls are generally associated with longer filter operating times.

Typically, when the filters are in good operating condition, for example, after they have just been repacked with new filter media, the pressure drop ($\Delta P$) in the brine flowing through the filters is quite low. It has been discovered, however, that substantial silica mud ball formation can occur in the filters without significantly increasing such filter $\Delta P$, and also without substantially affecting suspended particle size and concentration in the filtered brine. By the time filter $\Delta P$ and/or filtered brine suspended particle size and concentration significantly increase, thereby affecting filtering operation, mud ball formation has usually been found to be so extensive as ordinarily to require filter repacking with new filter media, at a relatively high cost.

In order to extend filter media life by reducing the formation rate of silicious mud balls, periodic backwashing of the filters has usually been performed. Ideally, with respect to filter media life, such filter backwashing is performed at sufficiently short intervals enabling the flushing out of any small mud balls which may have formed since the previous backwash and thereby prevent formation of large mud balls which tend to clog the filters and which are difficult to remove by backwashing.

Although desirable from the standpoint of filter media life, frequent filter backwashing not only requires extra filter capacity due to out-of-service time and requires appreciable labor but creates problems associated with disposal of backflush brine. As seen from the Figure, "dirty" backwash brine is discharged from filters 134 and 136, through conduits 130, 286 and 132, 288 to settling basin 128. From settling basin 128, pump 224 pumps the dirty backwash brine, together with brine from filter press 96, upstream to atmospheric flash vessel 60 for combining therein with the main geothermal brine flow. It has been found that the excessive diversion of filtered brine, which would otherwise be reinjected by pump 146 into wells 152 and 154, for backwashing of filters tends to overload and upset reactor-clarifier 92. Such upsetting of the reactor-clarifier can, in turn, cause the amount and particle size of suspended silica in the clarified brine to be increased, thereby resulting in even faster buildup of silicious mud balls in filters 134 and 136. Similar problems are obviously caused by increased backwash flow durations even when using longer backwash intervals. As a result, very frequent and/or long backwashing of filters 134 and 136 may, in fact, create significant problems.

Moreover, in the present case, it has been determined that conventional backwashing of filters (corresponding to filters 134 and 136) is relatively ineffective in flushing mud balls from the filter media. In a particular situation, it has, for example, been found that even backwashing the filters with system-compatible amounts of filtered brine about every eight hours of filter operation still enables only about a three months' operational life of the filter media before filter repacking is necessary.

According to the present invention, however, by preceeding the brine backwash with a steam scour, preferably using steam produced in low pressure flash crystallizer 58, effectiveness of the brine backwash operation in removal of silica mud balls from the filter media is greatly enhanced. This is because flowing steam through the filter media agitates the filter media and thereby loosens and breaks up the mud balls so that the resulting fragments can be easily flushed from the filters by the brine backwash. As a result, for the same filter media life, intervals between backwashing can be considerably increased with resulting reduced labor costs and less out-of-service time for the filters. It should be appreciated that whenever a filter is out of service, additional filtration loading is put on the remaining, in-service filters. Reduced out-of-service filter time thus, in fact, results in lessened filter loading, thereby, in itself, tending to increase filter media life. Moreover, increased backwash intervals may enable use of fewer filters, thereby reducing system cost.

Other advantages of reduced frequency backwashing include use of less electric power to operate backwash pump 248 and pump 224 used to pump settled brine from basin 128 into atmospheric flash vessel 60.

On the other hand, if with pre-backwash, steam scouring, the same backwash schedule is used as with no steam scour, life of the filter media is expected to be greatly increased. Such media life extension may be from the present three or four months to about a year. Furthermore, with steam scour, less backwash brine will ordinarily be required, with the result that use of smaller backwash pumps, conduits and so forth may be enabled and system costs may correspondingly be reduced.

As mentioned above, air should not be used for scouring filter media in filters 134 or 136 (or filters corresponding thereto) because of increased precipitation of material caused by oxidation of ferrous ions in the brine to ferric ions. Also, in the ferrous to ferric ion oxidation, hydrogen ions are formed which cause increased acidification of the brine which, in turn, increases equipment corrosion.

Use for media filter steam scouring of steam generated from the geothermal brine in low pressure flash crystallizer 58 is highly advantageous not only from the availability standpoint but also because the steam will then be completely compatible with the brine. Such steam-brine compatibility is important because geothermal brine ordinarily has so complex a chemistry that the combining, for example, of non-geothermal brine derived scouring steam may cause chemical imbalances which result in accelerated scale formation on equipment. Still further, the low pressure steam from low pressure flash crystallizer 58 is of relatively low energy content and is, therefore, of limited general use, often being vented to the atmosphere and wasted.

In accordance with FIG. 1b, the filter regenerating process of the present invention is accomplished by first taking a selected one of the filters 134 and 136 out of filtering service, backwash holding vessel 138 being assumed to have previously been filled by opening of valve 240 in inlet conduit 236. Assuming, by way of example, that filter 134 is to be regenerated by backwashing, valves 292, 302 and 278 in respective clarified brine conduit 130, interconnecting conduit 300 and filtered brine outlet conduit 140 are closed. Valve 298 in backwash discharge conduit 288 remains closed and valve 296 in backwash discharge conduit 286 (from filter 134) is opened. Preferably, but not necessarily, drain valve 324 is opened to drain brine from filter 134 to settling basin 128, to an extent that the level of the remaining brine is at or below an upper surface 330 of anthracite layer 314. Drain valve 324 is then closed.

Backwash brine valves 282 and 284 in backwash conduits 262 and 264 are maintained in their normally closed condition and steam valve 308 in conduit 304 is opened to supply steam to manifold 274. Steam then flows upwardly from manifold 274 through sand and anthracite layers 312 and 314 and out through conduits 130 and 286 to settling basin 128. For the first few minutes, steam flowed into filter 134 may be quenched by raising the filter media and remaining entrapped brine temperature from a nominal filter temperature of about 225° F. to steam temperature which may, for example, be between about 250° F. and about 290° F. The quenching time depends upon the steam flow rate and the media and brine masses and temperatures, typically, about the first 10 minutes of steam flow is needed to accommodate such quenching. However, in some instances temperatures of the filters and the steam may be comparable and no steam quenching occurs.

After any steam quenching stops, steam scouring is provided at a sufficient rate and for a sufficient time duration to break up and/or loosen mud balls formed in the filter media during filter operation. Although there obviously exists some tradeoff between steam flow rate and steam scouring time, either or both being dependent upon filter condition, a steam flow rate of between about 2 and about 10 standard cubic feet per minute (SCFM) per square foot of filter cross-sectional area in the region of the media has been found usually adequate. A flow rate of between about 3 and about 7 SCFM per square foot of such cross-sectional area is, however, more preferred. At such steam flow rates, a steam scour of at least about 5 minutes (after quenching) is preferred. Steam pressure may, as above-mentioned, be about 10 psig.

Backflush steam is discharged from filter 134 through conduits 130 and 286. Preferably, the steam is, however, discharged from conduit 286 above the brine level in brine settling basin 128 so as to avoid brine agitation resulting in aeration with resulting additional potential precipitation and corrosion from the brine by mechanisms described above.

Preferably after the steam scouring phase has been completed, steam valve 308 is closed and brine valve 282 is opened. Pump 248 then pumps brine from holding vessel 138 into filter 134 through manifold 274. The backflush brine flowing upwardly through the filter media flushes out broken and loosened mud balls and other filtered debris from the filter media and also restratifies the different layers of the media bed which are typically intermixed by the steam scouring process. Dirty backwash brine is discharged from filter 134 through conduits 130 and 286 to settling basin 128. As previously noted, brine from settling pond is pumped, by pump 224, upstream through conduits 226 and 228 to atmospheric flash vessel 60 for combining with the main flow of brine therein, particles remaining suspended in the backwash brine being separated out in reactor-clarifier 92.

The brine backwash flow rate and time duration are selected to cause effective flushing of mud ball particles and debris from the filters, the extent of brine backflush needed depending upon condition of filter 134 after the steam scour. Tradeoffs obviously also exist between brine flow rate and backflush duration; however, a brine flow rate of between about 15 gpm and about 30 gpm per square foot of filter cross-sectional area in the region of the filter media has been found ordinarily to be quite effective. At such flow rates, a brine backflush time of between about 5 minutes and about 15 minutes is preferred. A backwash brine pressure of, for example, about 60 psig is provided by pump 248.

The present invention will be further described with reference to the following examples.

EXAMPLE 1

Two pilot-type media filters, designated as Filter "A" and Filter "B", each having a filter region cross-sectional area of about 1.5 square feet, are connected in parallel. Filter "A" is conventionally constructed with about a 16 inch graded gravel support bed on which is deposited about a 16 inch deep layer of sand having about 0.66 mm particle size. On the sand layer about an 18 inch deep layer of anthracite of about 2.0 mm particle size is deposited. Filter "B" is constructed with about a 34 inch layer of 0.66 mm sand on top of which is an about 18 inch deep layer of anthracite having a particle size of between about 1.4 mm and about 1.6 mm. Three non-metallic underdrain nozzles are installed in Filter B so that no gravel support bed is needed.

Clarified geothermal brine at a temperature of about 225° F. and about 60 psig is flowed through each filter at a rate of about 3 gpm per square foot of filter cross-sectional area for 6 days in a series of 6 runs, each of which is of between about 18 and 24 hours in duration. After each run, both Filters A and B are backwashed by reversing the flow of brine through the filters at the rate of about 25 gpm per square foot of filter cross-sectional area. Filter A is backwashed in this manner for between about 7 and 8 minutes and Filter B is backwashed in this manner for between about 6 and 7 minutes.

Prior, however, to each backwash of Filter B with brine, steam from the low pressure flash crystallizer (corresponding to low pressure flash crystallizer 58) is flowed through Filter B in the backwash direction at a rate of between about 6 and 7 SCFM per square foot of filter cross-sectional area and for a duration of about 5 minutes to steam scour the filter media. Prior to such steam scouring, brine is drained from Filter B so that the liquid level in the filter is about 2 inches above the upper surface of the anthracite layer. Filter pressure drop ($\Delta P$) for each filter is measured at various filtering time intervals during each of the 6 runs, Filter B $\Delta P$ being generally found to be about 1 or 2 psig below Filter A $\Delta P$.

At the end of the 6 day test, Filters A and B are disassembled and visually examined, with the following being found:

| FILTER A | FILTER B |
| --- | --- |
| ¼" mud balls are found at about 9" from top of anthracite | No evidence of mud balls is found in anthracite layer |
| ¼" mud balls are found at about 15" from top of anthracite | No evidence of mud balls is found in anthracite sand interface |
| ¼" mud balls are found at about 5" from top of sand Gravel is found coated with sludge-like material | No evidence of mud balls is found in sand layer |
| Underdrain chamber has about 1/16" sludge buildup Mud balls are found scattered throughout filter cross section. | Under drain chamber is clean Non-metallic distribution nozzles are free of debris. |

EXAMPLE 2

The testing as described in EXAMPLE 1 is repeated, with the exceptions: (a) in Filter A the 2.0 mm anthracite is replaced with anthracite having a particle size between about 1.4 and 1.6 mm, (b) the test is run for 8 days, there thus being 8 runs of between about 18 and 24 hours each, followed by backwashing for both filters and steam scouring for Filter B, and (c) the brine backwash duration for Filter A is between about 7 and 8 minutes and for Filter B is between about 5 and 6 minutes.

The filter $\Delta P$'s are periodically measured during filtering cycles and the Filter B $\Delta P$ is found generally to be about 1 or 2 psig, and in some runs as much as 4 psig, below that of Filter A.

At the end of the testing, Filters A and B are disassembled and visually examined, with the following being found:

| FILTER A | FILTER B |
| --- | --- |
| ¼" mud balls are found in top 3" of anthracite, small chunks of sludge like material are found. | At 7" from top of sand bed some mixing of sand and anthracite is found. |
| At 10" from top of anthracite, anthracite is found coated with sludge like material | Anthracite and sand layers are found free from debris. |
| At 2" from bottom of anthracite, anthracite is found coated with sludge-like material (more pronounced) ¼" mud balls are found. | Under drain chamber is found clean. |
| At 2" from top of sand bed, sand is found coated with sludge-like material, ¼" mud balls are found. Gravel bed is found coated with sludge-like material. | Non-metallic distribution nozzles are free of debris. |

While particular embodiments of the present invention have been described herein, it will, of course, be understood that the invention is not limited thereto since many obvious modifications can be made. For example, the brine backflushing may, according to particular application, be started before the steam backflush is completed or may even be started before the steam backflush is started. Moreover, some types of filters may be constructed so as to enable continual brine backflushing by diversion of some of the inflow of brine to the filters. In such case, the steam backflush may be on either a periodic or continual basis, as may be required or desired. In the case of a continual flow of steam backflush, the steam-caused media agitation would primarily prevent the formation of mud balls, as opposed to breaking up and/or loosening mud balls formed between backwashes. It is thus intended to include within this invention any such modifications as will fall within the scope of the appended claims.

What is claimed is:

1. A process for regenerating media filters used for filtering geothermal brine, the filter regenerating process comprising:
   (a) flowing steam through said filter in a backflush direction, so as to cause agitation of the filter media; and
   (b) flushing out said filter by flowing geothermal brine through said filter in the backflush direction.

2. A process for regenerating media filters used for filtering geothermal brine, the filter regenerating process comprising:
   (a) flowing steam through said filter in a backflush direction, so as to cause agitation of the filter media and the loosening and breaking up of agglomerations of filtered material entrapped in the filter; and
   (b) flowing, filtered geothermal brine through said filter in the backflush direction, so as to flush out the filtered material loosened and broken up by the steam flow, and, when the media filters include two or more layers of different media, to stratify said layers.

3. The filter regenerating process as claimed in claims 1 or 2 wherein said geothermal brine is under substantial natural pressure upon extraction from the earth and wherein the steam flowing step includes flowing steam obtained by the flashing of said geothermal brine to a reduced pressure so as to convert some of the brine into steam.

4. The filter regenerating process as claimed in claims 1 or 2 wherein said steam is flowed at a rate of between about 2 SCFM and about 10 SCFM per square foot of filter cross section area in the region of the filtering media.

5. The filter regenerating process as claimed in claim 4 wherein the steam flow rate is between about 3 SCFM and about 7 SCFM per square foot of filter cross-sectional area in the region of the filtering media.

6. The filter regenerating process as claimed in claims 1 or 2 wherein the duration of the steam flow is selected for causing at least about 5 minutes of actual steam flow through the filter after any initial steam quenching by the filter media and brine remaining therein.

7. The filter regenerating process as claimed in claims 1 or 2 including the step of at least partially draining from the media filter geothermal brine remaining therein prior to flowing steam through the filter.

8. The filter regenerating process as claimed in claims 1 or 2 wherein the brine is flowed at a rate of between about 15 gpm and about 30 gpm per square foot of filter cross-sectional area in the region of the filtering media.

9. The filter regenerating process as claimed in claim 8 wherein the brine flow rate is between about 20 gpm and about 28 gpm per square foot of filter cross sectional area in the region of the filtering media.

10. The filter regenerating process as claimed in claims 1 or 2 wherein the duration of the brine flow is at least about 5 minutes.

11. The filter regenerating process as claimed in claims 1 or 2 wherein the brine used for backflushing is brine that has been filtered through the media filter.

12. The filter regenerating process as claimed in claims 1 or 2 wherein the filter comprises a mixed media filter, the steam and geothermal brine backwash being flowed into the filter through the lowermost one of the media layers.

13. The filter regenerating process as claimed in claims 1 or 2 including an initial step of draining brine from the filter until the brine level is only slightly above the upper surface of the filtering media.

14. In a geothermal brine handling facility for obtaining steam from a flow of naturally pressurized, silica-rich geothermal brine, said facility having a flashing stage in which the brine is flashed to a lower pressure to convert some of the brine to steam, having a crystallization stage in which flashed brine is contacted with seed material so as to cause supersaturated silica precipitating from the brine to crystallize onto said seed material, having a clarification stage wherein the crystallized silica is separated from the brine to produce a clarified brine and having one or more media filters through which the clarified brine is flowed in a filtering direction so as to remove fine silica particles from the clarified brine, a process for regenerating said media filter, said process comprising:
   (a) ceasing the filtering flow of clarified brine through one or more selected media filter and at least partially draining the brine therefrom;
   (b) flowing steam converted from the geothermal brine in the flashing stage, through the selected filter, in a reverse, backflush direction, at a flow rate and for a flow duration causing substantial agitation of the filter media and the breaking up and loosening of agglomerated filtered material entrapped in the selected filter; and
   (c) flowing, thereafter, through the selected filter, in the reverse direction, previously filtered geothermal brine, at a flow rate and for a flow duration causing the flushing out of the filtered material broken up and loosened by the steam flow, and, when the media filters comprise two or more layers of different media, to stratify said media layers.

15. The filter regenerating process as claimed in claim 14 wherein the steam flowed through the selected filter is at a pressure of at least about 10 psig.

16. The filter regenerating process as claimed in claim 14 wherein the steam is flowed through the selected filter at a rate of between about 2 SCFM and about 10 SCFM per square foot of filter cross-sectional area in the region of the filter media, the duration of the steam flow being at least about 5 minutes after the ceasing of steam quenching by the filter media and any brine entrapped therein.

17. The filter regenerating process as claimed in claim 14 wherein the backflush flow of filtered brine through the selected filter is at a rate of between about 15 gpm and about 30 gpm per square foot of filter cross sectional area in the region of the filter media, the duration of the filtered brine flow being at least about 5 minutes after ceasing of the steam flow.

18. The filter regenerating process as claimed in claim 14 wherein the process further comprises combining of the backflush brine discharged from the selected filter with the flashed geothermal brine in the flashing stage.

19. In a geothermal brine handling facility for obtaining steam from a flow of naturally pressurized, silica-rich geothermal brine, said facility having a flashing stage in which the brine is flashed to a lower pressure to convert some of the brine to steam, the brine becoming thereby supersaturated with silica, said facility further having a crystallization stage in which the flashed brine is contacted with seed material so as to cause silica precipitating from the brine to crystallize onto said seed material, having a clarification stage wherein the crystallized silica is separated from the brine to produce a clarified brine and having one or more media filters through which the clarified brine is flowed in a filtering direction so as to remove fine silica particles from the clarified brine, a process for regenerating said media filters, said process comprising:

(a) stopping the filtering flow of the clarified brine through one or more selected media filters and draining at least some of the brine therefrom;

(b) flowing through the selected filter in a reverse, backflush direction, steam converted from the geothermal brine in the flashing stage, so as to agitate the filter media and break up and loosen agglomerations of filtered material entrapped in the filter media, the steam flow rate being between about 2 SCFM and about 10 SCFM per square foot of filter cross sectional area in the region of the filter media, the duration of the steam flow being at least about 5 minutes after quenching of the steam by the filter media and any remaining entrapped brine;

(c) flowing, after the flow of steam has stopped, through the selected filter, in the backflush direction, previously filtered brine, so as to flush out of the media the filtered material broken up and loosened by the preceding steam flow, and, when the media filters are comprised of two or more different media, to stratify the media layers, the brine flow rate being between about 15 gpm and about 30 gpm per square foot of filter cross-sectional area in the region of the filter media, the duration of said brine flow being at least about 5 minutes; and (d) combining for disposal, the flow of backflush brine discharged from the selected filter with the flashed geothermal brine in the flashing stage.

20. The filter regenerating process as claimed in claims 14 or 19 wherein the media filter comprises a layer of sand.

21. The filter regenerating process as claimed in claim 20 wherein the media filter further comprises a layer of anthracite.

22. A process for regenerating a media filter used for filtering geothermal brine which is naturally pressurized to at least about 300 psig and which contains substantial amounts of dissolved silica, the pressurized brine being flashed to a lower pressure to convert some of the brine into steam, the flashed brine being contact with seed material onto which silica from the brine crystallizes and the flashed brine being flowed through a reactor-clarifier stage in which the crystallized silica is separated from the brine, the brine then being flowed through the media filter for filtering, the filter regenerating process comprising:

(a) flowing steam through said filter in a backflush direction, so as to cause agitation of the filter media;

(b) blushing out said filter by flowing geothermal brine through said filter in the backflush direction, geothermal brine backwash being discharged from the filter; and (c) combining the backwash brine discharged from the filter with the geothermal brine upstream of said reactor-clarifier stage.

23. A process for regenerating a media filter used for filtering geothermal brine which is naturally pressurized to at least about 300 psig and which contains substantial amounts of dissolved silica, the pressurized brine being flashed to a lower pressure to convert some of the brine into steam, the flashed brine being contacted with seed material onto which silica from the brine crystallizes and the flashed brine being flowed through a reactor-clarifier stage in which the crystallized silica is separated from the brine, the brine then being flowed through the media filter for filtering, the filter regenerating process comprising:

(a) flowing steam through said filter in a backflush direction, so as to cause agitation of the filter media and the loosening and breaking up of agglomerations of filtered material entrapped in the filter;

(b) flowing filtered geothermal brine through said filter in the backflush direction, so as to flush out the filtered material loosened and broken up by the steam flow, and, when the media filters include two or more layers of different media, to stratify said layers, geothermal brine backwash being discharged from the filters; and (c) combining the backwash brine discharged from the filter with the geothermal brine upstream of said reactor-clarifier stage.

* * * * *